Patented Mar. 11, 1941

2,234,908

UNITED STATES PATENT OFFICE 2,234,908

MANUFACTURE OF HYDROGEN PEROXIDE

Gustav Adolph, Solln, Germany, and Max E. Bretschger, Buffalo, N. Y., assignors to Buffalo Electro-Chemical Company, Inc., Buffalo, N. Y.

No Drawing. Application November 17, 1937, Serial No. 175,096

5 Claims. (Cl. 204—84)

The present invention relates to the manufacture of hydrogen peroxide and more particularly to those procedures wherein bisulfates are electrolyzed in acid solution, the peroxide being obtained from the electrolyte by distillation.

Thus, for example, in the manufacture of hydrogen peroxide from a bisulfate, such as ammonium bisulfate, the ammonium bisulfate and sulfuric acid is electrolyzed in the conventional way with the production of a sulfuric acid solution of ammonium persulfate. The acid solution of ammonium persulfate is then subjected to distillation with the production of a residue containing high concentrations of sulfuric acid and ammonium persulfate. In accordance with procedures used heretofore this residue is diluted with water, fed to the electrolytic cells and the cycle repeated.

During the electrolysis and subsequent distillation foreign matter decreasing the quantity of hydrogen peroxide produced is formed or built up in the solution and it is a disadvantage of the prior procedures that these foreign bodies acting catalytically upon the hydrogen peroxide are constantly carried along throughout the whole cycle of the procedure. It has been suggested that the loss in yield may be diminished, firstly, by limiting and controlling carefully the time for forming and distilling the hydrogen peroxide and, secondly, that care is taken to constantly remove the catalysts, that is to say, to subject the whole solution to a lengthy, difficult, and expensive purification. Such a procedure is detrimental as it is necessary to have present a fairly high concentration of sulfuric acid in order to obtain hydrolysis and particularly to obtain distillation of hydrogen peroxide. However, where the concentration of acid during electrolysis is substantially the same as that in the distillation, disadvantages arise causing a loss of yield since the formation of monopersulfuric acid (Caro's acid) is favored.

Attempts have been made to overcome these disadvantages in practice by choosing a medial value for the sulfuric acid concentration. This results, however, in a condition wherein the content of acid will be too high for the electrolysis and too low for the distillation.

It is an object of the present invention to provide a method of manufacturing hydrogen peroxide in which these disadvantages would be substantially eliminated.

It is also an object of the present invention to provide a procedure for manufacturing hydrogen peroxide wherein good yields are obtained at substantially no increase in cost.

It is a still further object of the invention to provide a procedure for maintaining a minimum amount of catalysts in the solution used in a cyclic method of producing hydrogen peroxide from bisulfates.

In accordance with the procedures of the present invention the residual solution produced during the distillation of the sulfuric acid persulfate solution is not diluted with water upon discharge from the distilling apparatus prior to being fed to the electrolytic cells but the hot and highly saline solution is cooled to a point where a heavy paste of the ammonium bisulfate and sulfuric acid is produced. This paste of crystals is fed into a centrifuge and the liquid solution, consisting mainly of concentrated sulfuric acid, separated from the bisulfate. The catalysts formed or picked up during the electrolysis and distillation are for the most part entirely in the separated sulfuric acid solution. The salt present in the centrifuge is dissolved with the desired quantity of water and the production of a solution containing only a small quantity of free acid is obtained. This solution is more suitable for electrolysis than the high acid bisulfate solution used heretofore, since, due to its low acid content and high content, therefore, of positive ions, for instance, ammonium ions, a higher yield is obtained in the subsequent electrolysis under the same electrolyzing conditions than has been possible heretofore.

Subsequent to the conversion by electrolysis of the bisulfate to persulfate by the conventional procedure, in accordance with the procedures of the present invention, so much of the previously centrifuged sulfuric acid is added to the persulfate solution before entering the distilling apparatus as is necessary to produce the most favorable acid degree necessary for the distillation, namely, a concentration of acid such as is set forth in our copending application Serial No. 142,671, that is to say, a concentration of from about 750 to 1050 grams of sulfuric acid per liter.

As the sulfuric acid is used repeatedly in the cyclic procedure, the catalysts causing decreased yields of hydrogen peroxide, become built up in the solution and will reach an undue concentration at which time the solution must be purified in the usual manner.

In accordance with the procedures of the present invention, economy of operation is effected by treating a fractional part of the separated sulfuric acid by the usual purification procedure and adding this purified fraction to the remainder still containing catalysts, thus, reducing the total content of catalysts in the solution to a concentration at which the catalysts do not adversely affect the yield. Where the quantity of sulfuric acid separated is greater than that required for addition to the persulfate solution, the purified fraction plus an amount of unpurified acid sufficient to bring the acid concentration to the required level, is added to the cell solution prior to distillation.

It will be seen from the forgeoing that the instant invention provides a procedure for manufacturing hydrogen peroxide wherein increased yields of hydrogen peroxide are obtained at economy of operation by maintaining catalysts adversely affecting the yield of hydrogen peroxide at a minimum.

What is claimed is:

1. The method of manufacturing hydrogen peroxide from ammonium bisulfate-sulfuric acid solutions by electrolysis thereof and subsequent distillation of the electrolytic solution so formed which comprises cooling the residual liquid remaining subsequent to distillation of the electrolyte until a pasty crystal mass of sulfuric acid and bisulfate is produced, separating the crystals from the acid, purifying a fraction of the acid by eliminating the catalytic material therefrom and adding the purified portion and the unpurified portion to an electrolyzed solution of the separated crystals and subsequently distilling the mixture.

2. The method of manufacturing hydrogen peroxide from ammonium bisulfate-sulfuric acid solutions by electrolysis thereof and subsequent distillation of the electrolytic solution so formed which comprises cooling the residual liquid remaining subsequent to distillation of the electrolyte until a pasty crystal mass of sulfuric acid and bisulfate is produced, separating the crystals from the acid, purifying a fraction of the acid by eliminating the catalytic material therefrom, adding the purified fraction of sulfuric acid to an electrolyzed solution of the separated crystals and subsequently distilling the mixture.

3. The method of manufacturing hydrogen peroxide from ammonium bisulfate-sulfuric acid solutions by electrolysis thereof and subsequent distillation of the electrolytic solution so formed which comprises cooling the residual liquid remaining subsequent to distillation of the electrolyte until a pasty crystal mass of sulfuric acid and bisulfate is produced, separating the crystals from the acid, purifying a fraction of the acid by eliminating the catalytic material therefrom, dissolving the crystals and electrolyzing the same, adding the purified fraction of sulfuric acid together with the unpurified product to the electrolyzed solution of the separated crystals and subsequently distilling the mixture.

4. The method of manufacturing hydrogen peroxide from bisulfate-sulfuric acid solutions by electrolysis thereof and subsequent distillation of the electrolytic solution so formed which comprises cooling the residual liquid remaining subsequent to distillation of the electrolyte until a pasty crystal mass of sulfuric acid and bisulfate is produced, separating the crystals from the acid, dissolving the crystals and electrolyzing the same, purifying the acid, adding the purified sulfuric separated acid in proper proportions to the electrolyzed solution of the separated crystals and subsequently distilling the mixture.

5. The cyclic method of manufacturing hydrogen peroxide from ammonium bisulfate-sulfuric acid solutions by electrolysis thereof and subsequent distillation of the electrolytic solution so formed which comprises cooling the residual liquid remaining subsequent to distillation of the electrolyte until a pasty crystal mass of sulfuric acid and bisulfate is produced, separating the crystals from the acid, forming an aqueous solution of the crystals and subjecting the solution to electrolysis to form persulfates, purifying the acid by eliminating catalytic material therefrom, adding sulfuric acid so purified to the persulfate solution and distilling the mixture.

GUSTAV ADOLPH.
MAX E. BRETSCHGER.